(12) United States Patent
McKenna et al.

(10) Patent No.: US 9,386,781 B2
(45) Date of Patent: Jul. 12, 2016

(54) MEAT SORTATION

(71) Applicant: Cargill, Incorporated, Wayzata, MN (US)

(72) Inventors: David R. McKenna, Benton, KS (US); Paul B. Hiemenz, Wichita, KS (US); H. Glen Dolezal, Jr., Wichita, KS (US); Bilynn Johnson, Lubbock, TX (US)

(73) Assignee: CARGILL, INCORPORATED, Wayzata, MN (US)

( * ) Notice: Subject to any disclaimer, the term of this patent is extended or adjusted under 35 U.S.C. 154(b) by 126 days.

(21) Appl. No.: 14/223,262

(22) Filed: Mar. 24, 2014

(65) Prior Publication Data

US 2014/0205739 A1     Jul. 24, 2014

Related U.S. Application Data

(63) Continuation of application No. 13/250,090, filed on Sep. 30, 2011, now Pat. No. 8,721,405, which is a continuation of application No. 11/460,394, filed on Jul. 27, 2006, now Pat. No. 8,147,299, which is a continuation of application No. PCT/US2006/004392, filed on Feb. 8, 2006.

(60) Provisional application No. 60/651,019, filed on Feb. 8, 2005, provisional application No. 60/711,201, filed on Aug. 24, 2005.

(51) Int. Cl.
*A22B 5/00*    (2006.01)
*A22C 17/00*   (2006.01)
*A23L 1/31*    (2006.01)

(52) U.S. Cl.
CPC ............... *A22C 17/008* (2013.01); *A22B 5/007* (2013.01); *A22C 17/0086* (2013.01); *A23L 1/31* (2013.01)

(58) Field of Classification Search
CPC .. A22C 17/00; A22C 17/0073; A22C 17/008; A22C 17/0086
USPC ................................. 452/149, 150, 156–158
See application file for complete search history.

(56) References Cited

U.S. PATENT DOCUMENTS

| 3,773,175 A | 11/1973 | Wallace |
| 3,930,991 A | 1/1976 | Gillespie |
| 4,194,267 A | 3/1980 | Johnson et al. |

(Continued)

FOREIGN PATENT DOCUMENTS

| AU | 199924991 | 11/1999 |
| DE | 10050836 | 6/2002 |

(Continued)

OTHER PUBLICATIONS

PCT International Search Report of PCT/US06/004392, mailed May 12, 2006 (2 pages).

(Continued)

*Primary Examiner* — Richard Price, Jr.
(74) *Attorney, Agent, or Firm* — Kagan Binder, PLLC (57) ABSTRACT

A system and method for sorting animal protein is provided. The method includes determining a desired characteristic of a cut of meat from an animal portion and associating the desired characteristic with an attribute of the animal portion. The attribute is ascertained and the animal portion is sorted based on the ascertained attribute. Like animal portions are grouped together for further processing as a group.

6 Claims, 6 Drawing Sheets

(56) References Cited

U.S. PATENT DOCUMENTS

| | | |
|---|---|---|
| 4,413,279 A | 11/1983 | Gorl |
| 4,668,457 A | 5/1987 | Nakai et al. |
| 4,785,817 A | 11/1988 | Stouffer |
| 5,079,951 A | 1/1992 | Raymond et al. |
| 5,178,227 A | 1/1993 | Kvisgaard et al. |
| 5,194,036 A | 3/1993 | Chevalier et al. |
| 5,234,098 A | 8/1993 | Pedersen |
| 5,353,796 A | 10/1994 | Schroeder et al. |
| 5,398,290 A | 3/1995 | Brethour |
| 5,470,274 A | 11/1995 | Kadi et al. |
| 5,520,183 A | 5/1996 | Lake et al. |
| 5,573,002 A | 11/1996 | Pratt |
| 5,668,634 A | 9/1997 | Newman |
| 5,673,647 A | 10/1997 | Pratt |
| 5,813,195 A | 9/1998 | Nielsen et al. |
| 5,836,880 A | 11/1998 | Pratt |
| 5,872,314 A | 2/1999 | Clinton |
| 5,881,889 A | 3/1999 | Poulsen |
| 5,937,080 A | 8/1999 | Vogeley, Jr. et al. |
| 5,944,598 A | 8/1999 | Tong et al. |
| 5,998,740 A | 12/1999 | Kvisgaard et al. |
| 6,084,407 A | 7/2000 | Ellis |
| 6,099,473 A | 8/2000 | Liu et al. |
| 6,123,451 A | 9/2000 | Schaefer et al. |
| 6,198,834 B1 | 3/2001 | Belk et al. |
| 6,200,210 B1 * | 3/2001 | Pratt ................ A22B 5/007 452/52 |
| 6,262,377 B1 | 7/2001 | Nielsen et al. |
| 6,408,223 B1 | 6/2002 | Skyum et al. |
| 6,470,825 B1 | 10/2002 | Johnson, III et al. |
| 6,478,667 B2 * | 11/2002 | Bell ................ A22B 5/0017 452/141 |
| 6,533,125 B1 | 3/2003 | Jensen |
| 6,549,289 B1 | 4/2003 | Ellis |
| 6,712,221 B2 | 3/2004 | Kvisgaard et al. |
| 6,722,506 B1 | 4/2004 | Nielsen et al. |
| 6,735,326 B1 | 5/2004 | Schimitzek |
| 6,796,184 B2 | 9/2004 | King |
| 6,843,169 B2 | 1/2005 | Nielsen |
| 6,877,460 B1 | 4/2005 | Ellis |
| 6,891,961 B2 | 5/2005 | Eger et al. |
| 7,039,220 B2 * | 5/2006 | Kriesel ................ G01B 11/25 382/110 |
| 7,258,237 B2 | 8/2007 | Nielsen |
| 7,399,220 B2 * | 7/2008 | Kriesel ................ A01K 11/008 452/157 |
| 7,670,213 B2 * | 3/2010 | Martin ................ G06F 17/30 452/198 |
| 2002/0000814 A1 | 1/2002 | Robinson, Jr. |
| 2003/0072472 A1 | 4/2003 | Haagensen et al. |
| 2003/0140865 A1 | 7/2003 | Fuqua |
| 2004/0055383 A1 | 3/2004 | King |
| 2004/0176874 A1 | 9/2004 | Kvisgaard et al. |
| 2004/0262202 A1 | 12/2004 | Jensen |
| 2005/0032471 A1 | 2/2005 | Pfarr et al. |
| 2005/0120848 A1 | 6/2005 | Nielsen |
| 2005/0186896 A1 | 8/2005 | Nielsen |
| 2005/0189274 A1 | 9/2005 | Nielsen |
| 2007/0157776 A1 | 7/2007 | Sorensen et al. |
| 2007/0178819 A1 | 8/2007 | McKenna et al. |
| 2007/0202229 A1 | 8/2007 | Nielsen |
| 2008/0056874 A1 | 3/2008 | Choai |

FOREIGN PATENT DOCUMENTS

| | | |
|---|---|---|
| EP | 0337661 | 10/1989 |
| EP | 1213584 | 6/2002 |
| EP | 1026516 | 10/2006 |
| FR | 2672775 | 8/1992 |
| GB | 2273774 | 6/1994 |
| GB | 2303211 | 2/1997 |
| WO | 8700010 | 1/1987 |
| WO | 9114180 | 9/1991 |
| WO | 9200523 | 1/1992 |
| WO | 9321597 | 10/1993 |
| WO | 9324832 | 12/1993 |
| WO | 9425867 | 11/1994 |
| WO | 9808088 | 2/1998 |
| WO | 9820339 | 5/1998 |
| WO | 9839627 | 9/1998 |
| WO | 9841860 | 9/1998 |
| WO | 9919727 | 4/1999 |
| WO | 9942823 | 8/1999 |
| WO | 0002043 | 1/2000 |
| WO | 0049400 | 8/2000 |
| WO | 0104607 | 1/2001 |
| WO | 0122081 | 3/2001 |
| WO | 2004105474 | 12/2004 |
| WO | 2006086450 | 8/2006 |

OTHER PUBLICATIONS

Scanvaegt Brochure, Automatic Raw Material Sorting and Quality Control Scanvision™, 2 Pages, Found at: http://wwvv.scanvaegt.mom/files/filer/int/pdf/products/processing%20equiprnent/scanvision Datablad Int.pdf. Fas of Jul. 29, 2008).

Document entitled RE: Rancher's Registry™ Fresh Boxed Beef and Case Ready Ground Beef, dated Dec. 5, 2002 (1pg).

* cited by examiner

MEAT SORTATION

CROSS-REFERENCE TO RELATED APPLICATION(S)

This application is a Continuation of U.S. patent application, Ser. No. 13/250,090, filed Sep. 30, 2011, which is a Continuation of U.S. patent application, Ser. No. 11/460,394, filed Jul. 27, 2006, which is a Continuation of International Application No. PCT/US2006/004392, filed on Feb. 8, 2006, which claims priority to U.S. Provisional Application No. 60/711,201, filed on Aug. 24, 2005 and U.S. Provisional Application No. 60/651,019, filed on Feb. 8, 2005, the contents of which are incorporated in their entirety by reference herein.

FIELD OF THE INVENTION

The present invention generally relates to a meat sortation system and method. The present invention more particularly relates to a meat sortation system and method for sorting meat based on an attribute of an animal carcass, primal, or subprimal of the animal, or sorting any portion thereof based on an attribute.

BACKGROUND OF THE INVENTION

It is known to sort bovine animal carcasses based on the weight of such carcasses. The sorted carcasses are subsequently processed as a group. Such sortation and processing is done in an attempt to provide cuts of meat having similar characteristics. Current systems for sortation and processing based on weight, however, do not in fact provide cuts of meat having similar characteristics. Generally, the resulting cuts of meat are dissimilar in size, weight, etc. due to variation among the group (i.e. carcasses of similar weight may vary greatly in the ratio of lean to fat, muscle size, etc.).

It is also known to sort bovine animal carcasses based on the yield grade of such carcasses. The term "yield grade" as used herein is intended to include the measure of boneless, closely trimmed lean meat resulting from a carcass. Yield grade is primarily related to the fat thickness of the carcass, and is related to the "KPH" (a measure of kidney, pelvic and heart fat), hot weight, and ribeye area of the carcass. The carcasses sorted based on yield grade are subsequently processed as a group. Such sortation and processing is done in an attempt to provide cuts of meat having similar characteristics. Current systems for sortation and processing based on yield grade, however, do not in fact provide cuts of meat having similar characteristics. Generally, the resulting cuts of meat are dissimilar in size, weight, etc. due to variation among the group (i.e. carcasses of similar yield grade may vary greatly in the size and density of muscles, etc.).

It is also known to provide a system to sort bovine animal carcasses based on the quality grade of such carcasses. The term "quality grade" as used herein refers to a USDA measure that represents the expected palatability. Quality grade is determined by the approximate age of the carcass and the amount of intramuscular fat (i.e., marbling) found in the ribeye muscle between the $12^{th}$ and $13^{th}$ rib. Common USDA quality grades include "Prime", "Choice", and "Select". The carcasses sorted based on quality grade are subsequently processed as a group. Such sortation and processing is done in an attempt to provide cuts of meat having similar characteristics. Current systems for sortation and processing based on yield grade, however, do not in fact provide cuts of meat having similar characteristics. Generally, the resulting cuts of meat are dissimilar in size, weight, composition, etc. due to variation among the group (i.e. carcasses of similar quality grade may vary greatly in the ratio of lean to fat, muscle size, etc.).

It is also know that such previously described sortation systems and methods are used independently and/or in combination with each other.

Accordingly, there is a need for a system and method that provides for sorting of carcasses, primals, subprimals, or other animal portion based on one or more attributes of the animal portion. There is also a need for a system and method for providing cuts of meat having similar characteristics. It would be advantageous to provide a meat sortation system and method filling any one or more of these needs or having other advantageous features. Moreover, the present invention is applicable to the sorting of meat for further processing regardless of whether it is still attached to the carcass.

BRIEF SUMMARY OF THE INVENTION

A method of sorting animal protein including determining a desired characteristic of a cut of meat from the animal portion and associating the desired characteristic with an attribute of the animal portion. The attribute is ascertained and the animal portion is sorted based on the ascertained attribute. Using the method of sorting animal protein, like animal portions are grouped together for further processing as a group.

A method of sorting animal protein including measuring an attribute of a first carcass having a first value and measuring an attribute of a second carcass having a second value. Each of the first and second value are reviewed to determine whether they are within a predetermined range of values. A first cut of meat of the first carcass is sorted into a first group if the first value is within the predetermined range of values and is sorted into a second group if the first value is outside the predetermined range of values. A second cut of meat of the second carcass is sorted into the first group if the second value is within the predetermined range of values and is sorted into the second sort group if the second value is outside the predetermined range of values. The first group and the second group are separately fabricated in batches into cuts of meat smaller than each of the first cut of meat and the second cut of meat. Using the method of sorting animal protein, the smaller cuts of meat from the first group are generally uniform.

A meat sorting process including identifying at least one attribute of meat to be processed and determining at least one of a threshold value and a range of threshold values relating to the at least one identified attribute for sorting the meat. The meat is grouped based on whether the meat satisfies the at least one of a threshold value and a range of threshold values relating to the at least one identified attribute. The meat is then further processed.

A method for sorting beef strip loin subprimals including determining a desired weight and thickness of primary strip steaks from the beef strip loin subprimals. The ribeye area of the beef strip loin subprimals is ascertained and it is determined whether the ribeye area falls within a predetermined range. The beef strip loin subprimals are sorted based on whether the ribeye area falls within the predetermined range. Using the method of sorting beef strip loin subprimals, beef strip loin subprimals having a ribeye area within the predetermined range are grouped together for further processing into strip steaks as a group.

A system of sorting animal protein including means for associating a desired characteristic of a cut of meat from the animal portion with an attribute of the animal portion, means for ascertaining the attribute of the animal portion, and means sorting the animal portion based on the ascertained attribute. Using the system for sorting animal protein, like animal portions are grouped together for further processing as a group.

While multiple embodiments of the invention are disclosed in this disclosure, still other embodiments of the present teachings will become apparent to those skilled in the art from the following detailed description, which shows and describes illustrative embodiments. As will be realized, the teachings are capable of modifications in various obvious aspects, all without departing from the spirit and scope of the present teachings. Accordingly, the drawings and detailed description are to be regarded as illustrative in nature and not restrictive.

DETAILED DESCRIPTION

A system and method for sorting animal portions based on one or more attributes of the carcasses, primals, subprimals, or other portion of the animal is provided. The system and method may be used for producing cuts of meat having similar characteristics.

Figure 1:
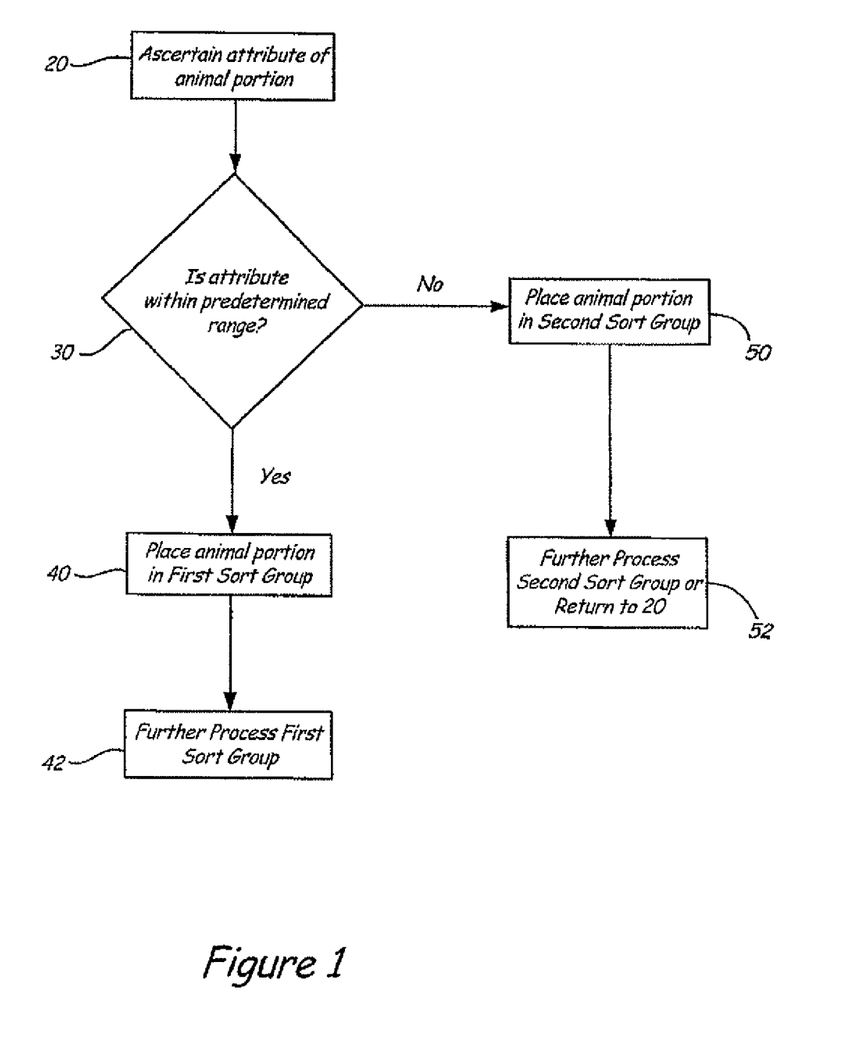
FIG. 1 shows a flow diagram of a method of sorting meat according to a preferred embodiment of the present invention.

A method of sorting meat is shown in FIG. 1 as a meat sortation method 10 according to one embodiment. The meat sortation method may be used to optimize the yield of certain cuts of meat (e.g., primary steaks fabricated from a subprimal) and provide cuts of meat having similar characteristics. For example, the cuts of meat may be substantially uniform in size and geometry (among other things). The term "uniformity" as used herein includes at least one of consistency in meat yield, portion size, surface area, weight, thickness, length, width, depth, color, etc. For example, uniform cuts of meat may have substantially consistent (i.e., small variations) length, width, thickness, and/or weight in accordance with one embodiment.

The method of sorting meat includes ascertaining an attribute of the animal portion (a carcass, primal, subprimal, or other portion), shown at 20. Ascertaining may include identifying the attribute and measuring the attribute. After the attribute is ascertained, the method includes determining if the attribute is within a predetermined range of values (or relative to a threshold value), shown at 30, and grouping then animal portion based on whether the attribute is within that range of values, shown at 40 and 50. The attribute identified may be associated with a characteristic of the desired cut of meat; though it is to be noted that more than one attribute may be associated with a characteristic and more than one characteristic may be associated with an attribute. In certain embodiments, all carcasses, primals, subprimals, or other portions of the animals having an attribute within a predetermined range of values are processed together. In certain embodiments, all carcasses, primals, subprimals, or other portions of the animals having an attribute outside a predetermined range of values go through a further iteration of the method of sorting meat based on a different attribute or a different range of values of the same attribute.

The meat sortation method includes ascertaining an attribute (e.g., characteristic, parameter, etc.) of an animal portion (carcass, primal, subprimal, or other portion), shown at 20 of FIG. 1, according to one embodiment. Ascertaining may comprise identifying, measuring, quantifying, analyzing the animal portion relating to the attribute. In certain embodiments, the attribute to be ascertained is directed to a property or quality of the lean (e.g. meat, muscle, etc.) or to a property or quality of the fat. For example, an attribute relating to the lean may be ribeye area and an attribute relating to the fat may be kernel fat area or seam fat area. More specifically, measurement of properties of the muscle (e.g., beef rib ribeye lip-on subprimal of the bovine carcass) includes measurement of the area (e.g. ribeye area, "REA"), length, width, depth, volume and density of the muscle. Measurement of the properties of the fat, for example, include measurement of the intermuscular fat such as kernel fat ("K fat") of the beef rib ribeye, lip-on subprimal, or the seam fat of the chuck eye roll subprimal. The attribute to be ascertained may also be directed to a combination of properties of the muscle and the fat according to alternative embodiments. In further embodiments, the attribute may relate to another characteristic of the carcass, such as size, hide quality, gender, etc.

Measurement of the attribute may be accomplished using any suitable method or system. For example, measurement of the attribute may be accomplished via objective criteria using equipment (e.g. cameras or vision grading) to determine surface area, color, linear measures such as length, width, and/or depth, etc.; x-ray to determine volume; ultrasound to measure volume or linear such a length, width, and/or depth; laser to measure length, width, depth, volume, etc.; thermo-graphy to measure volume or linear measures such as length, width, and/or depth; magnetic resonance imaging (MRI) to measure volume or linear measures such as length, width, and/or depth; computerized tomography (CT) to determine volume or linear measures such a length, width, and/or depth; nuclear magnetic resonance (NMR) to measure volume or linear measures such as length, width, and/or depth, etc.); or hand-measurements or subject criteria (e.g. estimates by human visualization and/or evaluation).

The meat sortation method further includes sorting meat based on the measured attribute of the animal portion according to one embodiment. Such sorting may comprise determining if the attribute is within a predetermined range of values, shown at 30 of FIG. 1, and grouping the animal portions (carcasses, primals, subprimals, or other portion) based on whether the attribute is within that range of values, shown at 40 and 50 of FIG. 1. Sorting results in grouping meat (carcasses, primals, subprimals, or other portion) having like attributes. For example, meat (e.g. strip loin subprimal) of one carcass that is measured to have a ribeye area of about 15 inches squared is grouped with meat of another carcass that is measured to have about the same ribeye area.

Figure 2A:
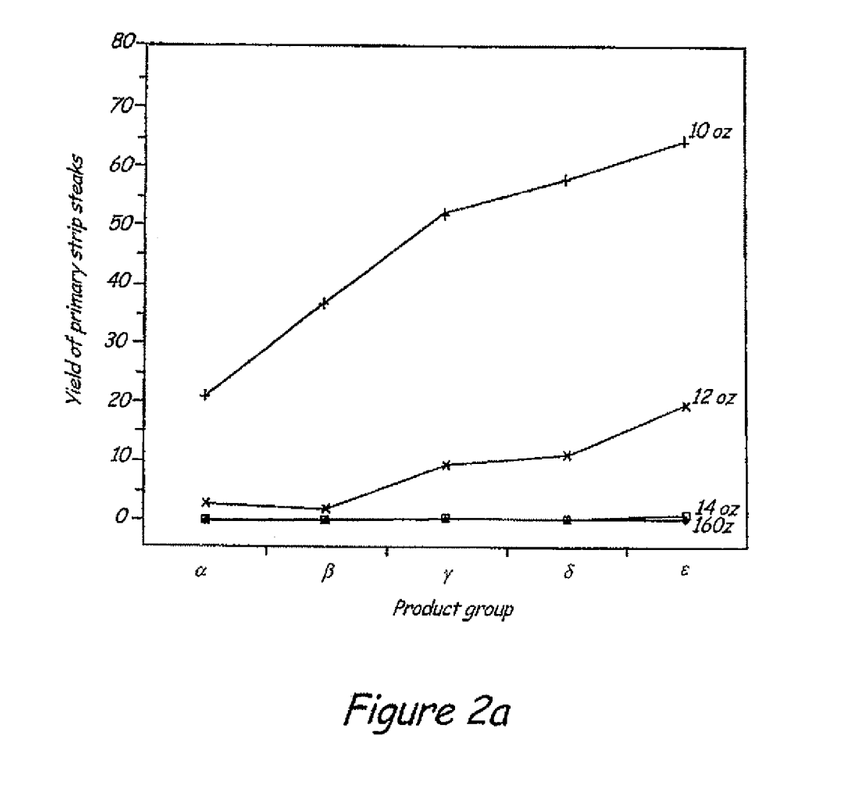
FIG. 2A shows a graph of calculated least means primary product yield percent for various product groups given a steak thickness range of 0.5-1.0" according to the method described in Example 1.
Figure 2B:
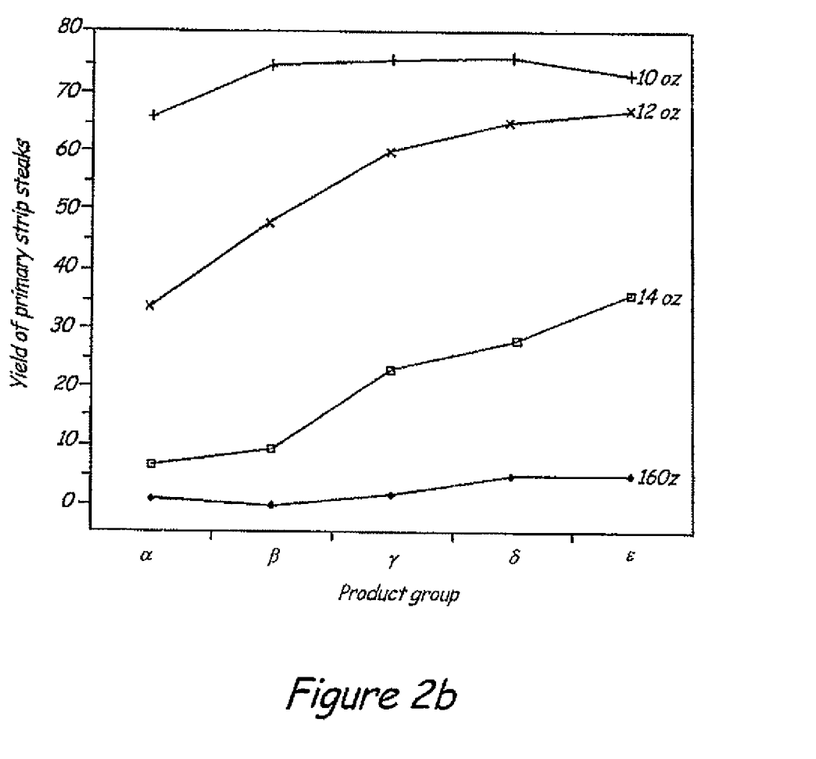
FIG. 2B shows a graph of calculated least means primary product yield percent for various product groups given a steak thickness range of 0.75-1.25" according to the method described in Example 1.
Figure 2C:
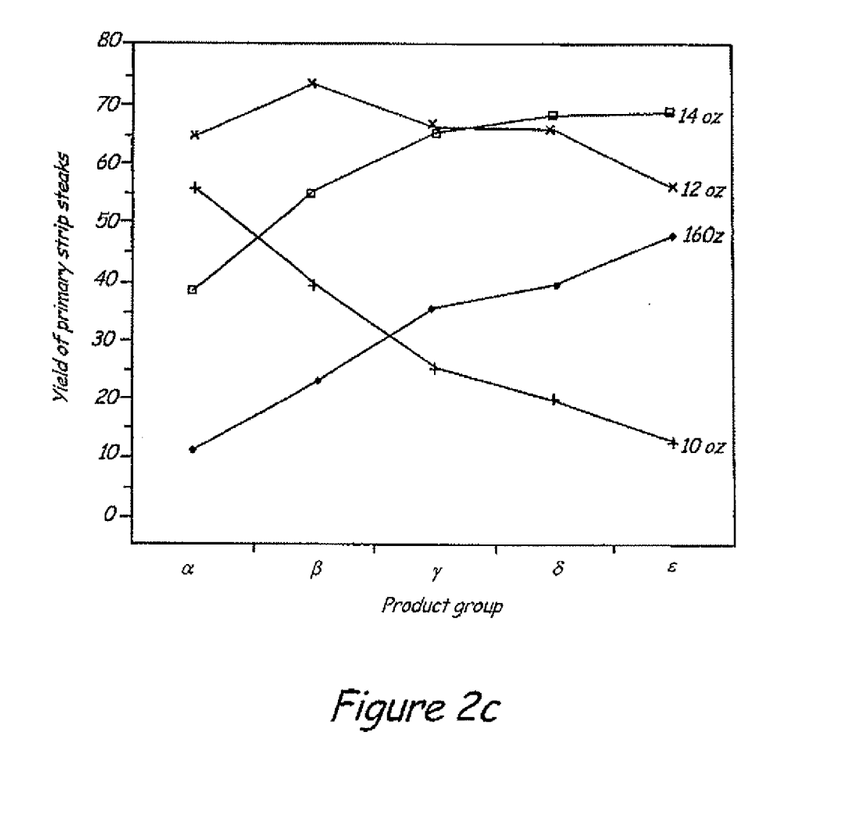
FIG. 2C shows a graph of calculated least means primary product yield percent for various product groups given a steak thickness range of 1.0-1.5" according to the method described in Example 1.
Figure 2D:
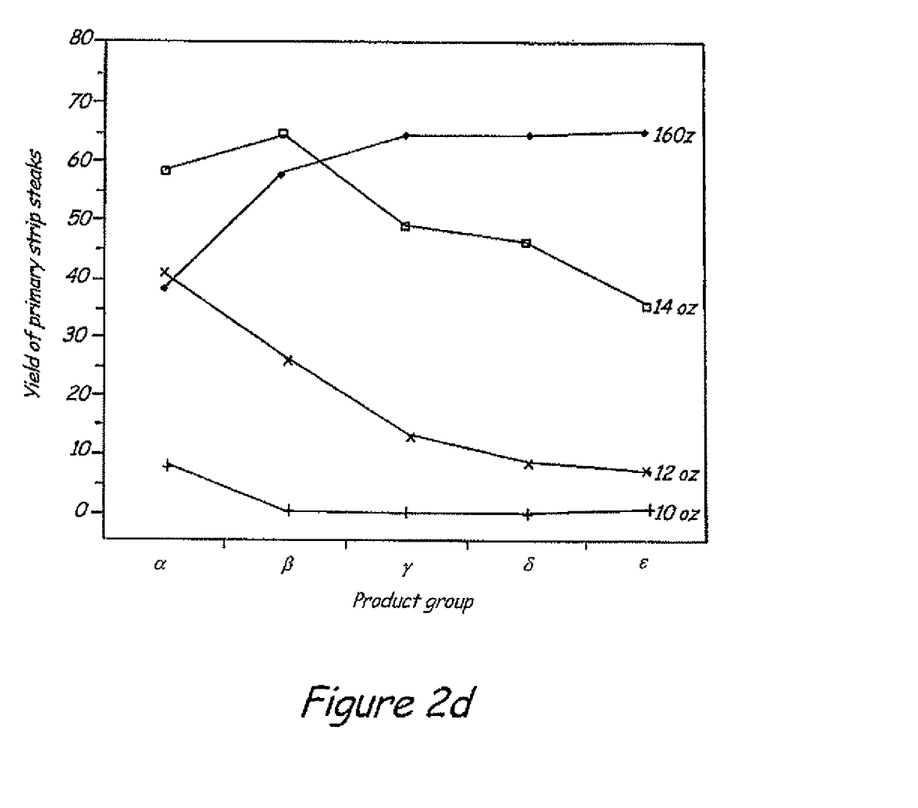
FIG. 2D shows a graph of calculated least means primary product yield percent for various product groups given a steak thickness range of 1.25-1.75" according to the method described in Example 1.
Figure 2E:
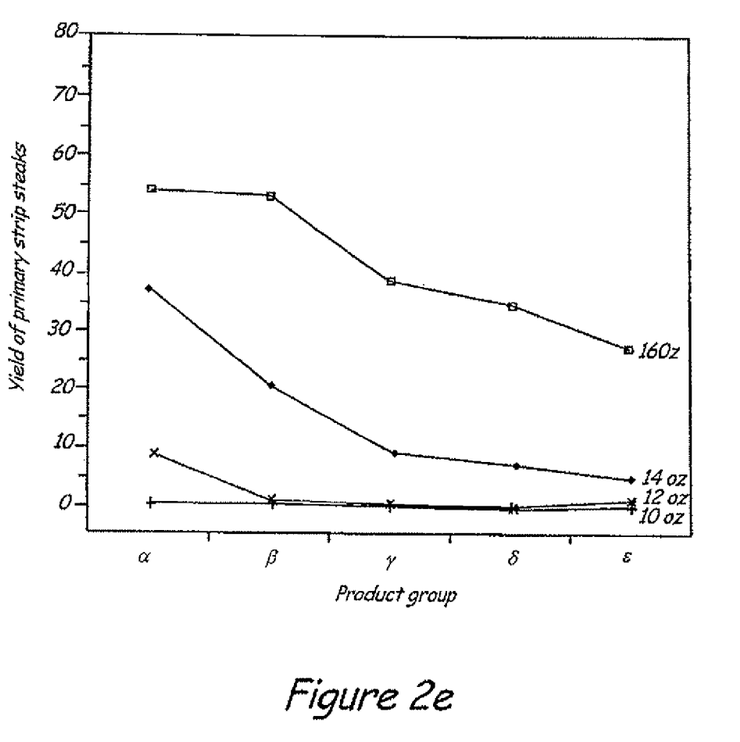
FIG. 2E shows a graph of calculated least means primary product yield percent for various product groups given a steak thickness range of 1.50-2.00" according to the method described in Example 1.

The predetermined range for the attribute, or threshold value of the attribute, is selected to maximize or obtain a desired outcome (e.g. optimized cutting yield of primary steaks, fixed thickness of primary steaks, etc.) according to a preferred embodiment. The attribute identified may be associated with a characteristic of the desired cut of meat. Thus, for example, if the characteristic of the desired cut of meat is that the cut be primary 10 oz strip steaks with a thickness of 1.25 inches, and the attribute is ribeye area, a threshold or range for the ribeye area is determined at which there is the greatest yield of cuts of primary 10 oz strip steaks with a thickness of 1.25 inches (see Example 1 and FIG. 2C).

Selection or determination of the predetermined range or threshold value of an attribute may be done via routine experimentation and regression equations by one skilled in the art. Also, a threshold value may be based on experience (e.g., historical data) and modified based on experience (e.g., historical data). Furthermore, threshold values may be adjusted based on industry norms for a cut of meat (e.g., the amount of fat in a ribeye). Also, threshold values may be selected based on the desired outcome. That is, the sorting may maximize a particular cut of meat based on one threshold value, but depending on the cut of meat that is to be obtained, a particular threshold value may be selected. As understood by a person of ordinary skill in the art, threshold values may be based on analysis of historical data or physical characteristics of a carcass or a portion thereof using a computer to do such analysis (e.g., regression analysis or other probability based analysis). For example, it may be determined that a certain ribeye area of a beef strip loin subprimal provides the greatest yield of primary 10 oz strip steaks with a thickness of 1.25 inch (see Example 1 and FIG. 2C), and a different ribeye area of the same beef strip loin subprimal provides the greatest yield of a primary 14 oz strip steak with a thickness of 1.25 inch (see Example 1 and FIG. 2C).

In accordance with alternative embodiments, the threshold value of an attribute (e.g. density, weight, volume, etc. of muscle) may be selected to provide the optimum or the desired yield of primary steaks (e.g., ribeyes, strips, tenderloin, chuck, flank, etc.). In accordance with yet a further embodiment, the threshold value of the attribute may be selected based on the specification of a customer (e.g. maximum acceptable intermuscular fat such as Kfat or seam fat in a steak).

After ascertaining the attribute and determination of whether the attribute meets a threshold value or is within a predetermined range, the animal portion (carcass, primal, subprimal, or other portion) is grouped with other portions so measured. Thus, all carcasses, primals, subprimals, and/or other portions of meat wherein the attribute meets the threshold value or falls within the predetermined range may be grouped together in a first sort group. All portions wherein the attribute does not meet the threshold value or falls outside the predetermined range may be grouped together in a second sort group or may undergo a further iteration of sorting.

Such sort groups of similar meat (e.g., carcasses, primals, subprimals, individual cuts, other animal portion, etc.) may be sorted by a sorting device (e.g., means for sorting) such as a meat sort table model no. ScanBatcher 4700 sort table commercially available from Scanvaegt US, Inc. of Gainesville, Ga., USA. Further, ascertaining the attribute and determining whether the attribute is within a predetermined range or meets a threshold value may be done via measurement technology, described below, and a computer.

The sort groups may be further processed as a group (e.g., in a batch). That is, the meat that satisfies the threshold value will be processed in a manner to obtain the desired cut of meat. Thus, returning to Example 1 and FIG. 2c, beef strip loin subprimals (the meat portion) having ribeye area (the attribute) of α (the threshold value or predetermined range) for providing the greatest yield of primary 10 oz strip steaks with a thickness of 1.25 inch (the characteristic), may be processed into such strip steaks as a batch. Thus, further processing may include fabrication or cutting of the meat into smaller pieces (e.g. portioning strip loins into strip steaks). Thus, in one embodiment of this invention, the sorting by a characteristic based on a threshold value allows the meat processor to optimize obtaining cuts of meat it desires from each animal portion (carcass, primal, subprimal, or other portions).

Further processing of the sort groups provides optimized yield of primary steaks from the animal portion (carcass, primal, subprimal, or other portion). Such optimization may be to provide the highest yield (i.e., largest number) of a specific type of cut or may be used to provide the cuts based on customer specifications. For example, strip loins sorted by ribeye area may be processed as a group to provide an optimized yield of primary strip steaks at a fixed weight and variable thickness (see Example 1).

Batch fabrication of the sort groups also may provide uniform cuts of meat according to an alternative embodiment. For example, strip loins sorted by ribeye area may be processed as a group to provide strip steaks of a fixed weight and fixed thickness (see Example 2). More specifically, the resulting uniformity in the cuts of meat may assist in providing cuts of meat that appear uniformly sized to enabling standard packaging. Thus, for example, it may be desirable to use the meat sortation method to provide a package of 12 oz. steaks each having approximately the same length, width and thickness, for uniform plate coverage or to facilitate uniform cooking times.

Thus, as described above and shown in FIG. 1, a method 10 of sorting meat comprises ascertaining (identifying, measuring, quantifying, etc.) an attribute in an animal portion (carcass, primal, subprimal, or other portion), shown at 20, determining whether the attribute is of a threshold value or within a predetermined range, shown at 30, and grouping the animal portion based on whether the threshold value or range is met, shown at 40 and 50. In a particular embodiment, the meat sortation method 10 includes ascertaining (e.g. measuring, quantifying, etc.) an attribute of an animal, shown at 20, such as the ribeye area of a beef rib ribeye lip-on subprimal. After ascertaining the attribute, shown at 20, a determination may be made whether the attribute is within a predetermined range of values, shown at 30. This determination may be made by a control system using logic (described below). If it is determined that the attribute is within the predetermined range of values, shown at 30, then the meat (e.g. animal, primal, subprimal, etc.) is sorted in a first group, shown at 40. If the attribute is outside the predetermined range of values, shown at 30, then the meat is sorted in a second group, shown at 50. The meat of the first sort group is preferably further processed or fabricated as a single group, shown at 42, separate and distinct from the processing or fabrication of the meat of the second sort group, shown at 52. The meat from the second sort group may be fabricated as a single group, individually, or may be further sorted based on a further attribute or a second range of the same attribute.

The method shown in FIG. 1 may be applied to an suitable attributes and/or combinations of attributes of the carcass (e.g. lean, fat, etc.), including area and/or density according to various embodiments. Some of these attributes are described below.

Ribeye Area

Measurement of the ribeye area of a beef strip loin subprimal may be used to optimize cutting yield of the strip loin according to one embodiment. According to the meat sortation method 10 shown in FIG. 1, the ribeye area is measured at the USDA grading station (i.e. at the exposed lean surface between the $12^{th}$ and $13^{th}$ rib before the carcass is fabricated) according to a preferred embodiment. The ribeye area may be measured at the beginning of the fabrication line for beef ribs according to an alternative embodiment. In one embodiment, the ribeye area is measured using a computer vision grading system (described below).

If the measured ribeye area is within a predetermined range of values (e.g. 11.1 to 11.9 inches squared), than the strip loin is diverted to a first sort group. If the ribeye area is outside the predetermined range of values, then the strip loin is diverted to a second sort group. The first sort group is processed as a group (i.e. separate from the second sort group) and fabricated into primary steaks (e.g. strip steaks) having a predetermined weight (e.g. 12 oz) and a predetermined thickness (e.g. 1.0-1.5 inches). Generally, the first sort group will provide a higher yield of primary steaks (e.g. about 60% yield) than the second sort group. Accordingly, batch processing of the first sort group will optimize yield of primary steaks, and minimize yield of non-primary steaks (e.g. vein steaks, trim, fat and purge) according to a preferred embodiment.

Surface Area of KFAT

The surface area of a deposit of kernel fat (Kfat) may be measured to provide uniform cuts of ribeye steaks according to one embodiment. The term "Kfat" as used in this disclosure means and includes the deposit of intermuscular fat that accumulates between the M. longissimus thoracis, M. spinalis thoracis, and M. semispinalis thoracia in the cranial half of a beef rib ribeye lip-on subrimal.

The surface area of the Kfat visible at the lean interface between the $5^{th}$ and $6^{th}$ rib of a beef rib ribeye lip-on subprimal may be collected manually. More specifically, the surface area may be visually collected via manual measurement with the human eye in accordance with one embodiment of the meat sortation method shown in FIG. 1. In alternative embodiments, the surface area is ascertained via any suitable method. The surface area of the Kfat may be measured using vision grading according to an alternative embodiment (e.g. when the loin is presented at the loin fabrication processing line). The surface area of the Kfat is compared to the area of a reference object (e.g. 25 cent piece US currency) according to one embodiment. The volume of the Kfat many be measured using x-ray (such as a Model Eagle-FA manufactured by Smiths-Hiamann) or ultrasound technology (and the density may be determined based on the weight of the loin) according to an alternative embodiment.

If the surface area is within a predetermined range of values (e.g. at no point does the measured surface area of the Kfat extend beyond a circumference of a 25 cent piece US currency), then the beef rib ribeye lip-on subprimal is separated into a first sort group. If the measured circumference is outside the predetermined range of values, then the beef rib ribeye lip-on subprimal is separated into a second and distinct sort group. The first sort group is processed as a group (i.e. separate from the second group), and cut into primary steaks (e.g. ribeye steaks). Generally, the first sort group will provide a more uniform yield (e.g. fewer steaks having Kfat greater than the circumference of a 25 cent piece US currency) than the second sort group. Accordingly, batch processing of the first sort group will likely optimize uniformity of Kfat in ribeye primary steaks according to a preferred embodiment.

Volume of Seam Fat

The volume of a deposit of seam fat visible at the lean interface between the $5^{th}$ and $6^{th}$ rib of a chuck eye roll subprimal may be measured to provide higher yield of cooked meat portions of beef pot roast according to one embodiment. The volume of the seam fat is measured using x-ray or ultrasound according to various embodiments. In alternative embodiments, the volume of the seam fat may be measured by any other suitable method such as a vision grading system or manually. A control system may be used to make a determination whether the measured volume of the seam fat is within a predetermined range of values (e.g., 7 percent of raw subprimal weight) according to one embodiment. If the volume of a deposit of seam fat is within a predetermined range of values, then the chuck eye roll subprimal is grouped in a first sort group. If the volume of a deposit of seam fat is not within a predetermined range of values, the chuck eye roll subprimal is grouped in a second sort group. The first sort group is processed as a group (i.e. separate from the second group), and processed into fully cooked pot roast. Generally, the first sort group will provide a more uniform yield (e.g. less pockets of fat removed from pot roast portions) than the second sort group. Accordingly, batch processing of the first sort group will likely optimize uniformity of seam fat in fully-cooked pot roast according to a preferred embodiment.

Density of Subprimal

The yield of primary steaks from a strip loin subprimal may be optimized according to the meat sortation method shown in FIG. 1 according to one embodiment. The volume of the strip loin subprimal may be measured using laser equipment, such as the IPM III LaseEye X400 portion cutter equipped with Marcl 360° dual laser vision technology commercially available from Marel hf of Gardabaer Iceland according to one exemplary embodiment. In alternative embodiments, the volume of the strip loin subprimal is measured using any suitable method and/or equipment. The density of the strip loin is calculated (e.g. based on the weight of the strip loin acquired from a scale, which may be an in-motion scale). If the average density of the strip loin is within a predetermined range of values, then the strip loin is placed in a first sort group. If the average density of the strip loin is outside of a predetermined range of values, the strip loin is placed in a second and distinct sort group. The first sort group is processed as a group (i.e. separate from the second group) and out into primary strip steaks. Generally, batch processing of the first sort group will provide a greater yield of strip steaks than the second sort group.

Combinations of Attributes

In alternative embodiments, combinations of attributed may be used. Thus, for example, an animal portion (carcass, subprimal, primal, or other portion) may be sorted based on the measurement and value of a combination of attributes (first and second attributes) such as ribeye area and area of kfat.

In one embodiment, the animal portion may be sorted into a first sort group wherein both the both the first attribute and the second attribute are of a threshold value, a second sort group wherein the first attribute is of a threshold value but the second attribute is not of a threshold value, a third sort group wherein the first attribute is not of a threshold value but the second attribute is of a threshold value, and a fourth group wherein neither the first attribute nor the second attribute is of a threshold value.

In such embodiment, the animal portion may be sorted according to a first attribute wherein the animal portion is sorted into a first sort group if the first attribute is of a threshold value and a second sort group if the first attribute is not of a threshold value. The second sort group may then be sorted based on a second attribute wherein the second sort group is sorted into a third sort group if the second attribute is of a threshold value and a fourth sort group if the second attribute is not of a threshold value. Alternatively, the first sort group may be further sorted based on a second attribute.

In accordance with one embodiment, the meat sortation method is implemented by a meat sortation system. The meat sortation system includes a sensing system (e.g., having a sensor) configured for ascertaining an attribute (e.g., means for measuring an attribute of a carcass, primal, subprimal, or other portion of an animal). The sensing system is configured to provide a signal representative of the attribute to a control system (e.g. means for predicting an attribute of meat). The control system may include a computing device, microprocessor, controller or programmable logic controller (PLC) for implementing a control program, and which provides output signals based on input signals provided by the sensor or that are otherwise acquired. Any suitable computing device of any type may be included in the meat sortation system according to other exemplary embodiments. For example, computing devices of a type that may comprise a microprocessor, microcomputer or programmable digital processor, with associated software, operating systems and/or any other associated programs to implement the control program may be employed. The control system and its associated control program may be each implemented in hardware, software, firmware, or a combination thereof or in a central program implemented in any of a variety of forms (e.g., hardware and/or software and/or firmware) according to alternative embodiments.)

The meat sortation system may include a computer vision system. For example, a computer vision system comprising a camera that is typically used to obtain quality and yield characteristics of carcasses may be used. Example suitable computer vision systems include Model No. CVS v.6 from Research Management Systems, Inc. (RMS) and Model Cargill Ribeye from Facet Technology Corporation (Facet). The RMS and Facet systems are Computer Vision System (CVS) have the ability to acquire an image of the ribeye at the USDA grading station (or other location such as a subprimal fabrication line) and objectively measure ribeye area and shape, marbling percentage, fat thickness, lean/fat color, length, width, lower rib fat, etc.

The meat sortation system may also include an x-ray system such as a Smiths-Hiemann system, which has the ability to perform bone and cartilage detection, and fat content determination. The x-ray system can classify cuts of meat, perform measurements (based on two-dimensions or on volume) and perform image analysis (determine fat content, locate anomalies, identify bones, etc.). A bone detection system of the x-ray system detects bone and cartilage fragment in cut, ground and mixed meat types using variable intensity, high-speed X-ray radiation with multi-level difference filtering. This system uses advanced volumetric techniques, x-ray imagery and object detection software to determine fat content for small pieces of meat up to subprimals.

EXAMPLES

While the invention will now be described in connection with certain embodiments in the following examples so that aspects thereof may be more fully understood and appreciated, the examples are not intended to limit the invention to these particular examples.

Example 1

The density of a 1"×0" boneless beef strip loin was calculated using a stationary manual weight scale and a laser device of a portion-control cutting machine (model X400 commercially available from Marel hf). The cutting machine was programmed to cut the strip loin according to twelve different cutting specifications (based on portion weight and the minimum thickness of primary strip steaks), i.e.: four portion size end-points (10-, 12-, 14-, or 16-oz) for the primary product (i.e. strip steaks) and two portion size end-point (6-, or 8-oz) for vein steaks for a total of eight cutting specifications, and four additional cutting specifications were programmed into the machine that looked at serially cutting the strip loin into steaks of specific thickness (0.75-, 1.00-, 1.25-, or 1.50" thick steaks).

The same strip loin was sent through the X400 for each of the cutting specifications (i.e. 12 separate times) and the projected weight and thickness was recorded for each steak that would have been cut had the cutting system been activated. The results are shown in FIGS. 2A through 2E. The results show the percentage of yield of primary steaks (i.e. strip steaks with no vein on both sides of the steak) achieved for various product groups (i.e. group alpha having a ribeye area of about 11 inches squared, group beta having a ribeye area of about 12 inches squared, group gamma having a ribeye area of about 13 inches squared, group delta having a ribeye area of about 14 inches squared, and group epsilon having a ribeye area of about 15 inches squared). While each group is references with respect to a single number (11, 12, 13, 14, or 15), these numbers represent a range. Thus, for example, 11 inches squared represents the range between 10.5 inches squared and 11.4 inches squared, 12 inches squared represents the range between 11.5 inches squared and 12.4 inches squared, etc. The results show that certain sort groups have substantially higher yields of primary products (depending on the thickness requirements and the desired portion size).

Example 2

An experiment was designed to show that different variables could be controlled through appropriate selection criteria. The endpoint was classified as 11 oz. and 14 oz. boneless beef strip loin steaks with a thickness range of greater than 1" and less than 1.5". A total of 40 beef strip loins were selected for the test. Specifically, 20 beef strip loins were selected to maximize the yield and uniformity of 11 oz. beef strip loin steaks and 20 beef strip loins were selected to maximize the yield and uniformity of 14 oz. beef strip loin steaks. In addition, 40 beef strip loins were collected to serve as the control product for the test. Control product was not subjected to any special selection criteria, but was chosen to represent product that is produced under the current industry practices. Beef strip loins were portioned in a commercial processing facility under normal operating conditions. Results from the test are show in Table 1. Table 1 illustrates mean steak thickness measurements from beef strip loin steaks. The control group comprised beef strip loins that were not sorted.

TABLE 1

| Portion | Control, thickness in inches | Test, thickness in inches |
|---------|------------------------------|---------------------------|
| 11 oz.  | 1.03$^c$                     | 1.20$^b$                  |
| 14 oz.  | 1.32$^a$                     | 1.20$^b$                  |

$^{a-c}$means within the table with the same superscript are not different (P > 0.05)

The results in Table 1 show that thickness and portion size were controlled such that regardless of the desired portion size, steaks were uniformly thick (e.g., 1.20" thick). In contrast, there was much variation in thickness of steaks cut from control product as 11 oz. portions averaged 1.03" thick, whereas, 14 oz. portions averaged 1.32" thick. As expected, thickness and portion size were controlled such that regardless of the desired portion size, steaks would be uniformly thick (e.g., 1.20" thick). In contrast, there was much variation in thickness of steaks cut from control product as 11 oz. portions averaged 1.03" thick, whereas, 14 oz. portions averaged 1.32" thick.

Throughout this disclosure, the meat sortation system and method is described primarily with reference to ribeye and strip loins. However, the meat sortation system and method may be used for processing any of the meat areas (e.g. sirloin, chuck, rib, loin, flank/plate, brisket/shank primals, subprimals thereof and further cuts (e.g. bone-in, boneless, commodity, close-trimmed, combinations, etc.) thereof. Similarly, although many of the embodiments described in this disclosure relate to youthful beef (such as steers and heifers), but the meat sortation method is applicable to carcasses or subprimals from any animal protein including all bovine (Boa Taurus & Bos Indicus), porcine, equine, caprine, and ovine animals, or any other animal harvested for food production including poultry, fish and veal. In this specification, bovine animals include, but are not limited to, buffalo and all cattle, including steers, heifers, cows and bulls. Porcine animals include, but are not limited to, feeder pigs and breeder pigs, including sows, gilts, barrows and boars. Ovine animals include, but are not limited to, sheep, including ewes, rams, wethers and lambs.

The construction and arrangement of the elements of the meat sortation system and method as shown and described are illustrative only. Although only a few embodiments of the present inventions have been described in detail in this disclosure, those skilled in the art who review this disclosure will readily appreciate that many modifications are possible (e.g. variations in sizes, dimensions, structures, shapes and proportions of the various elements, values of parameters, use of materials, colors, orientations, etc.) without materially departing from the novel teachings and advantages of the subject matter disclosed in this application. Accordingly, all such modifications are intended to be included within the scope of the present inventions. The order or sequence of any process or method steps may be varied or re-sequenced according to other exemplary embodiments. In any claims, any means-plus-function clause is intended to cover the structures described herein as performing the recited function and not only structural equivalents but also equivalent structures.

Features described with regard to a particular exemplary embodiment may be utilized in conjunction with features described with regard to other exemplary embodiments. Other substitutions, modifications, changes and omissions may be made in the design, operating conditions and arrangement of the preferred and other exemplary embodiments without departing from the scope of the present inventions.

We claim:

1. A method for sorting bovine animal portions comprising:
   providing a plurality of animal portions having a ribeye area;
   determining a desired characteristic of a cut of meat to be fabricated from the plurality of animal portions, the characteristic being other than a USDA measure of yield grade or quality grade;
   associating the desired characteristic of the cut of meat to be fabricated from the plurality of animal portions with the ribeye area of the plurality of animal portions;
   ascertaining the ribeye area of the plurality of animal portions;
   determining whether the ribeye area falls within a predetermined range;
   sorting the plurality of animal portions based on whether the ribeye area falls within the predetermined range, wherein like animal portions are grouped together for further processing as a batch of animal portions that enables fabrication of uniformly sized cuts from the animal portions;
   fabrication of uniformly sized cuts from the animal portions; and
   grouping uniformly sized cuts of meat fabricated from the batch of animal portions.

2. The method of claim 1, wherein the animal portion is a carcass.

3. The method of claim 1, wherein the animal portion is a primal.

4. The method of claim 1, wherein the animal portion is a subprimal.

5. The method of claim 1, comprising determining the ribeye area using a computer vision grading system.

6. The method of claim 5, wherein the computer vision grading system is located adjacent to at least one of a USDA grading station and a fabrication line for fabricating like subprimal pieces of meat into smaller cuts of meat.

* * * * *